(12) United States Patent
Milligan

(10) Patent No.: US 10,215,099 B2
(45) Date of Patent: Feb. 26, 2019

(54) SYSTEM AND METHOD FOR LIMITING MOVEMENT OF A RETAINER RING OF A GAS TURBINE ENGINE

(71) Applicant: United Technologies Corporation, Hartford, CT (US)

(72) Inventor: Peter Milligan, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 761 days.

(21) Appl. No.: 14/616,144

(22) Filed: Feb. 6, 2015

(65) Prior Publication Data

US 2016/0230673 A1     Aug. 11, 2016

(51) Int. Cl.
| | | |
|---|---|---|
| F01D 25/24 | (2006.01) | |
| F02C 7/28 | (2006.01) | |
| F01D 11/02 | (2006.01) | |
| F02C 3/00 | (2006.01) | |
| F16J 15/44 | (2006.01) | |
| F01D 9/04 | (2006.01) | |
| F01D 11/08 | (2006.01) | |

(52) U.S. Cl.
CPC ............... *F02C 7/28* (2013.01); *F01D 11/02* (2013.01); *F01D 25/246* (2013.01); *F02C 3/00* (2013.01); *F16J 15/44* (2013.01); *F01D 9/04* (2013.01); *F01D 11/08* (2013.01); *F05D 2220/32* (2013.01); *F05D 2240/55* (2013.01)

(58) Field of Classification Search
CPC ..... F02C 7/28; F02C 3/00; F16J 15/44; F01D 11/02; F01D 25/246; F01D 11/08; F01D 9/04; F01D 5/3023; F01D 5/303; F01D 5/32; F05D 2220/32; F05D 2240/55
See application file for complete search history.

(56) References Cited

U.S. PATENT DOCUMENTS 4,016,918 A * 4/1977 Thacker .................. B60C 29/00
                                                152/415
4,247,248 A * 1/1981 Chaplin .................. F01D 11/08
                                                415/136

(Continued)

FOREIGN PATENT DOCUMENTS

EP    1707751    10/2006
EP    2011971    1/2009

(Continued)

OTHER PUBLICATIONS

Extended European Search Report dated Jul. 13, 2016 in European Application No. 16154183.4.

*Primary Examiner* — Eldon T Brockman
(74) *Attorney, Agent, or Firm* — Snell & Wilmer L.L.P.

(57) ABSTRACT

A method of installing a retaining ring assembly in a turbine case is provided. The method may include installing a blade outer air seal into a case before installation of a retaining ring assembly. The method may further include installing a key system on a retaining ring to create the retaining ring assembly. The method may also include installing the retaining ring assembly in a case. The method may further include rotating the retaining ring assembly in the case until key system is aligned with a case slot. The method may also include tightening the key system to the retaining ring and cause key system to engage the case slot.

9 Claims, 5 Drawing Sheets

(56) References Cited

U.S. PATENT DOCUMENTS

| | | | | |
|---|---|---|---|---|
| 5,395,211 | A * | 3/1995 | Johnson | F01D 21/045 |
| | | | | 415/209.2 |
| 5,848,874 | A * | 12/1998 | Heumann | F01D 9/042 |
| | | | | 411/24 |
| 6,554,552 | B2 * | 4/2003 | McKinlay | F16B 39/26 |
| | | | | 411/134 |
| 6,641,326 | B2 * | 11/2003 | Schilling | F16B 5/0275 |
| | | | | 403/337 |
| 8,152,455 | B2 * | 4/2012 | Wunderlich | F01D 11/08 |
| | | | | 415/173.1 |
| 9,188,062 | B2 * | 11/2015 | Tsutsumi | F01D 25/246 |
| 9,284,969 | B2 * | 3/2016 | Durocher | F16B 5/04 |
| 9,879,565 | B2 * | 1/2018 | Rogers | F01D 25/243 |
| 2002/0159857 | A1 * | 10/2002 | McKinlay | F16B 39/26 |
| | | | | 411/161 |
| 2015/0226124 | A1 * | 8/2015 | Tsutsumi | F01D 25/246 |
| | | | | 415/193 |
| 2016/0208652 | A1 * | 7/2016 | Rogers | F01D 25/243 |
| 2018/0112558 | A1 * | 4/2018 | Rogers | F01D 25/243 |

FOREIGN PATENT DOCUMENTS

| | | |
|---|---|---|
| EP | 2060750 | 5/2009 |
| EP | 2469043 | 6/2012 |

* cited by examiner

DETAIL A

SYSTEM AND METHOD FOR LIMITING MOVEMENT OF A RETAINER RING OF A GAS TURBINE ENGINE

FIELD

The present disclosure relates systems and methods for limiting the movement of a retaining ring, and more particularly, a key system and a corresponding method of installation for a retaining ring in a gas turbine engine.

BACKGROUND

In typical retaining ring installations, adjacent structures are used to radially retain retaining rings. In this regard, in a typically installation, the retaining ring would be captured by one or more, clips, fasteners, or parts and held radially against the static structure of the aircraft. However, where no adjacent static structure is available, a system and method of installation are needed to hold the retaining ring.

SUMMARY

A method of installing a retaining ring assembly in a turbine case may be provided. The method may include installing a blade outer air seal support into a case before installation of a retaining ring assembly. The method may further include installing a key system on a retaining ring to create the retaining ring assembly. The method may also include installing the retaining ring assembly in a case. The method may further include rotating the retaining ring assembly in the case until key system may be aligned with a case slot. The method may also include tightening the key system to the retaining ring and cause key system to engage the case slot.

In various embodiments, the key system may comprise a key washer. The key system may further comprise a fastener and a nut. The key washer may have a shape that corresponds to the case slot. The fastener may mount flush in a first side of the retaining ring. The fastener may protrude through second side of the retaining ring to engage the key washer and receive the nut. In this regard, the fastener may be installable through the retaining ring to mount the key washer to the retaining ring.

In various embodiments, the engagement of the case slot may be configured to restrain circumferential motion of the retaining ring assembly. The key washer may have a shape that corresponds to the case slot.

In various embodiments, the BOAS support may comprise a support tab. The retaining ring may also comprise a tab. The tab of the retaining ring may be aligned with the support tab in response to the sliding of the retaining ring. In various embodiments, the support tab may be configured to restrain radial motion of the retaining ring assembly.

In various embodiments, a retaining ring assembly may comprise a retaining ring, a fastener, a key washer, and a nut. The fastener may be installable through the retaining ring. The key washer may be installable on the fastener. The nut may be installable on the fastener. The nut may be configured to tighten the key washer to the retaining ring.

In various embodiments, the retaining ring may be installable in a high pressure turbine case.

In various embodiments, the retaining ring may further comprise support. The support may be configured to engage a blade outer air seal support tab.

In various embodiments, the key washer may restrain circumferential movement of retaining ring assembly in response to the retaining ring being installed in the high pressure turbine case. The BOAS support tab may restrain radial movement of the retaining ring assembly in response to the retaining ring being installed in the high pressure turbine case.

In various embodiments, gas turbine engine may comprise a compressor, a combustor, a turbine, and a retaining ring assembly. The combustor may be in fluid communication with the compressor. The turbine may be in fluid communication with the combustor. The retaining ring assembly may be installable in a turbine case. The retaining ring assembly may comprise a retaining ring, a fastener, a key washer and a nut. The fastener may be installable through the retaining ring. The key washer may be installable on the fastener. The nut may be installable on the fastener. The nut may be configured to tighten the key washer to the retaining ring. The nut may cause the key washer to engage the turbine case.

In various embodiments, the key washer may restrain circumferential movement of the retaining ring assembly in response to the retaining ring being installed in the high pressure turbine case. In various embodiments, the retaining ring may further comprise a support that may be configured to engage a blade outer air seal support tab. The BOAS support tab may restrain radial movement of the retaining ring assembly in response to the retaining ring being installed in the high pressure turbine case.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice these embodiments, it should be understood that other embodiments may be realized and that logical changes and adaptations in design and construction may be made in accordance with the present disclosure and the teachings herein. Thus, the detailed description herein is presented for purposes of illustration only and not for providing limitations on the scope of the disclosure. For example, the steps recited in any of the methods or process descriptions may be executed in any order and are not limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Moreover, surface shading lines may be used throughout the figures to denote different parts but not necessarily to denote the same or different materials.

Figure 1:
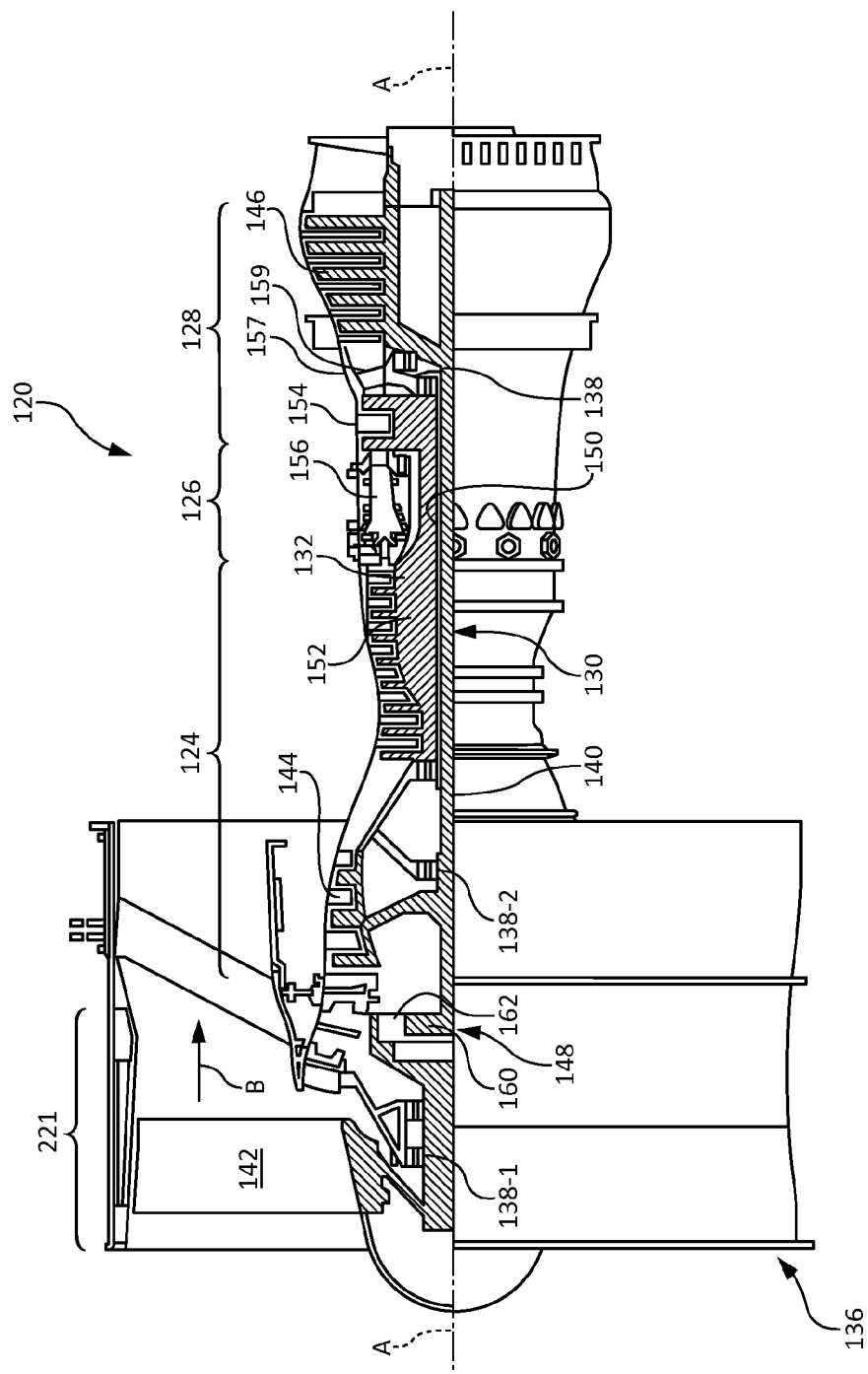
FIG. 1 illustrates a cross-sectional view of an exemplary gas turbine engine, in accordance with various embodiments.

In various embodiments and with reference to FIG. 1, a gas turbine engine 120 is provided. Gas turbine engine 120 may be a two-spool turbofan that generally incorporates a fan section 122, a compressor section 124, a combustor section 126 and a turbine section 128. Alternative engines may include, for example, an augmentor section among other systems or features. In operation, fan section 122 can drive air along a bypass flow-path B while compressor section 124 can drive air along a core flow-path C for compression and communication into combustor section 126 then expansion through turbine section 128. Although depicted as a turbofan gas turbine engine 120 herein, it should be understood that the concepts described herein are not limited to use with turbofans as the teachings may be applied to other types of turbine engines including three-spool architectures.

Gas turbine engine 120 may generally comprise a low speed spool 130 and a high speed spool 132 mounted for rotation about an engine central longitudinal axis A-A' relative to an engine static structure 136 via one or more bearing systems 138 (shown as bearing system 138-1 and bearing system 138-2 in FIG. 1). It should be understood that various bearing systems 138 at various locations may alternatively or additionally be provided including, for example, bearing system 138, bearing system 138-1, and bearing system 138-2.

Low speed spool 130 may generally comprise an inner shaft 140 that interconnects a fan 142, a low pressure (or first) compressor section 144 and a low pressure (or first) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 couples inner shaft 140 to a rotating fan structure. High speed spool 132 may comprise an outer shaft 150 that interconnects a high pressure compressor ("HPC") 152 (e.g., a second compressor section) and high pressure (or second) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 144 then HPC 152, mixed and burned with fuel in combustor 156, then expanded over high pressure turbine 154 and low pressure turbine 146. Mid-turbine frame 157 includes airfoils 159 which are in the core airflow path. Low pressure turbine 146 and high pressure turbine 154 rotationally drive the respective low speed spool 130 and high speed spool 132 in response to the expansion.

Gas turbine engine 120 may be, for example, a high-bypass geared aircraft engine. In various embodiments, the bypass ratio of gas turbine engine 120 may be greater than about six (6). In various embodiments, the bypass ratio of gas turbine engine 120 may be greater than ten (10). In various embodiments, geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about 5. In various embodiments, the bypass ratio of gas turbine engine 120 is greater than about ten (10:1). In various embodiments, the diameter of fan 142 may be significantly larger than that of the low pressure compressor 144, and the low pressure turbine 146 may have a pressure ratio that is greater than about 5:1. Low pressure turbine 146 pressure ratio may be measured prior to inlet of low pressure turbine 146 as related to the pressure at the outlet of low pressure turbine 146 prior to an exhaust nozzle. It should be understood, however, that the above parameters are exemplary of various embodiments of a suitable geared architecture engine and that the present disclosure contemplates other gas turbine engines including direct drive turbofans.

In various embodiments, blade outer error seals ("BOAS") are installed in the high pressure turbine. The BOAS may be held in place by a support segment and a retaining ring. During maintenance of the hot section of the engine and/or the turbine section of the engine, the BOAS may be removed and serviced or replaced. Moreover, the corresponding support structures and retaining wings may need to be removed and replaced. These support structures and retaining rings will also benefit from being held in place and/or secured so that the structures do not move and/or become free in the engine when the engine is operating.

In various embodiments and with reference to FIGS. 2A through 2E, turbine section 128 and/or case 129 (e.g., turbine case 129) may comprise and/or may be configured to receive a retaining ring 190. Retaining ring 190 may be configured to retain, support, secure and/or otherwise hold a BOAS support structure 149 and/or a BOAS corresponding to a turbine blade of turbine section 128. Retaining ring 190 may be installable within slot 181. Slot 181 may be defined in case 129.

If left unrestrained, retaining ring 190 may freely spin within slot 181. The movement of retaining ring 190 may increase during engine operation when the engine is vibrating. This movement may cause wear and/or stress on retaining ring 190.

In various embodiments, retaining ring 190 may be supported by BOAS support structure 149. The BOAS support structure 149 may comprise one or more support tabs 180 formed on a portion of BOAS support structure 149. Retaining ring 190 may comprise one or more supports 192 (e.g., tab). Support 192 may be alignable with support tab 180. In this regard, support 192 is radially supported by support tab 180, minimizing the movement of retaining ring in a radio fashion relative to the centerline of A-A of engine 120 as shown in FIG. 1, retaining ring 190 may further be engagable by a key system 170 (e.g., key system 170 may be tightened against retaining ring 190).

In various embodiments, key system 170 may comprise a key 172 (e.g., a key washer) and a fastener system 175. Fastener system 175 may comprise any suitable fastener 174 and any suitable fastener retainer 176. For example, fastener 174 may be a screw, threaded shaft, bolt, and/or the like. Fastener retainer 176 may be a nut or any other suitable tightening device that is configured to engage fastener 174. In this regard, fastener system 175 may be configured to engage and retain key 172 against retaining ring 190.

In various embodiments, one or more keys 172 of key system 170 may be configured to engage one or more case slots 184 defined in case 129. In this regard, key 172 may have a shape that corresponds to the shape of case slot 184. The shape of key 172 may be complimentary to the shape of case slot 184 to insure a proper fit (e.g., a tight fit to minimize movement of retaining ring 190). One or more case slot 184 may be positioned at specific positions allowing retaining ring to be rotated and clocked at a particular position. This may allow retaining ring 190 and, more specifically, support 192 to align with support tab 180.

In various embodiments, the engagement between key 172 and case slot 184 may also limit and/or restrain the circumferential motion of retaining ring 190 circumferential motion within slot 181. The engagement between support 192 and support tab 180 may also limit and/or restrain the radial motion of retaining ring 190 within slot 181.

In various embodiments, retaining ring 190 may comprise one or more supports 192. Similarly, BOAS support structure 149 may comprise one or more corresponding support tabs 180. Retaining ring 190 may also be configured to receive one or more keys 172. Case 129 may comprise one or more corresponding case slots 184.

Figure 2A:
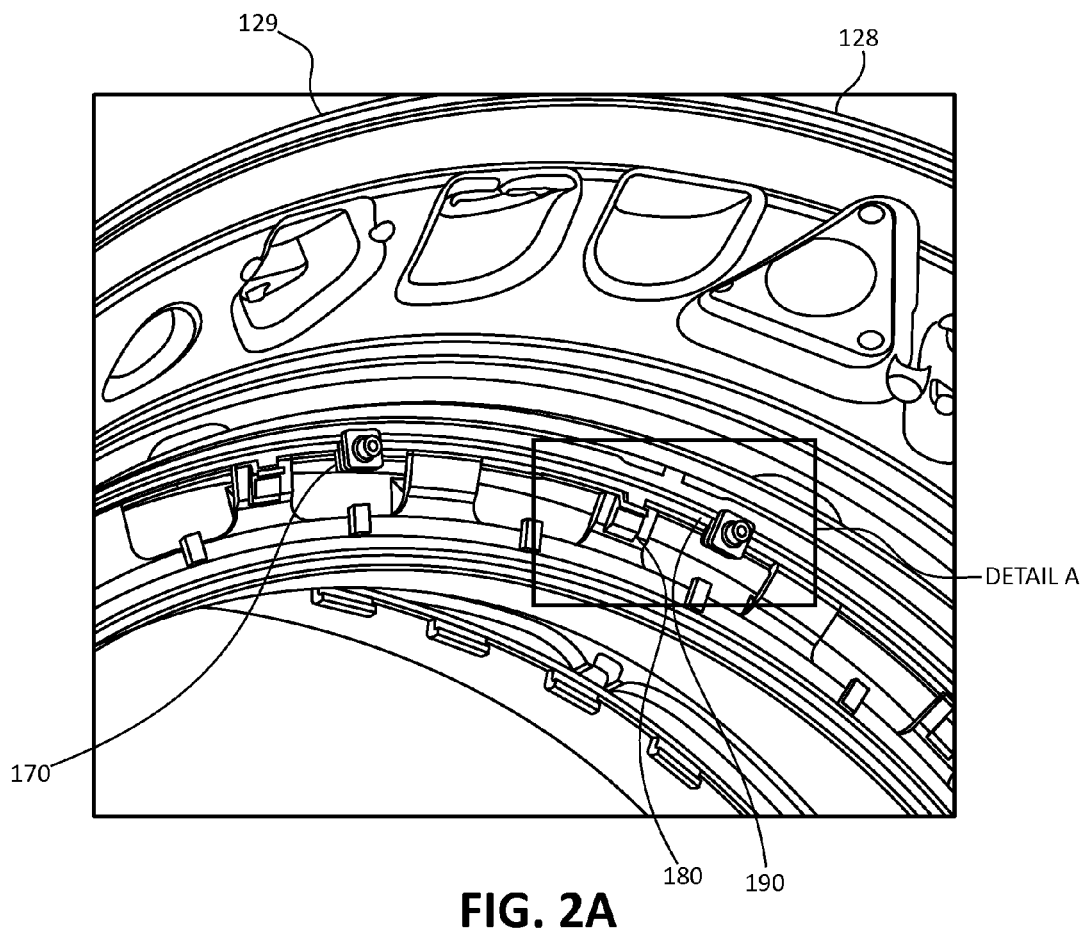
FIG. 2A illustrates a perspective view of a portion of the high pressure turbine, in accordance with various embodiments.
Figure 2B:
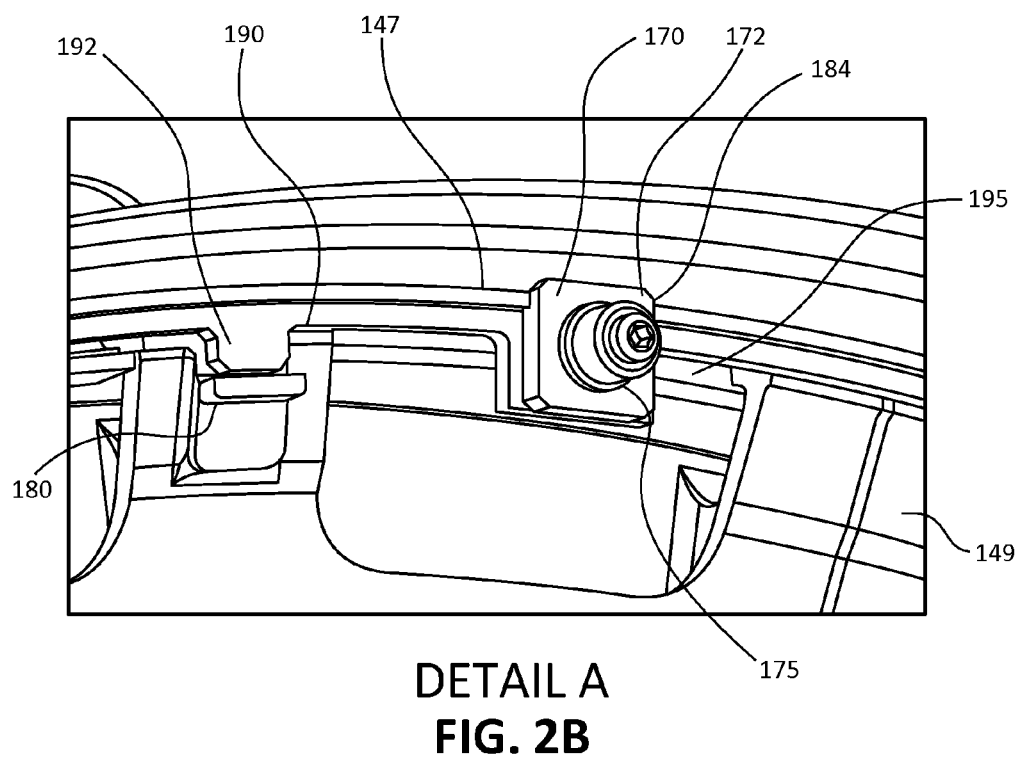
FIG. 2B illustrates a perspective view of a portion of the high pressure turbine, in accordance with various embodiments.
Figure 2C:
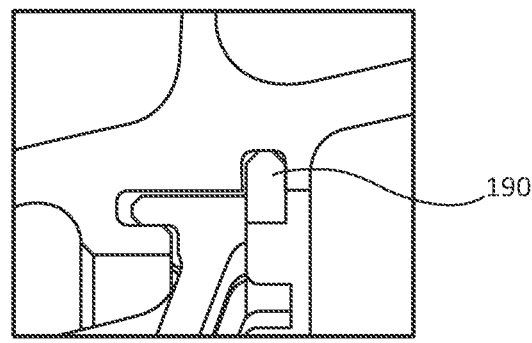
FIG. 2C illustrates a cross-sectional view of retaining ring installed in a high pressure turbine case at a first circumferential location, in accordance with various embodiments.
Figure 2D:
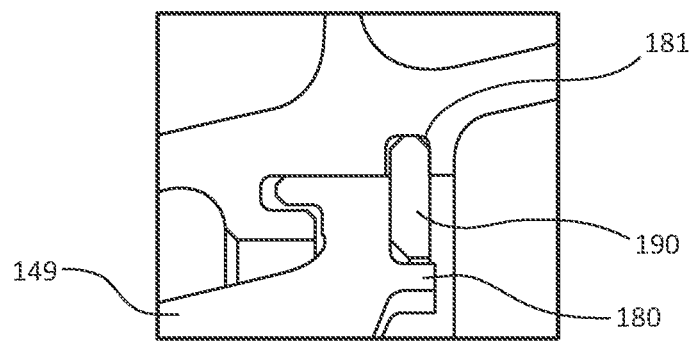
FIG. 2D illustrates a cross-sectional view of retaining ring installed in a high pressure turbine case at a second circumferential location, in accordance with various embodiments.
Figure 2E:
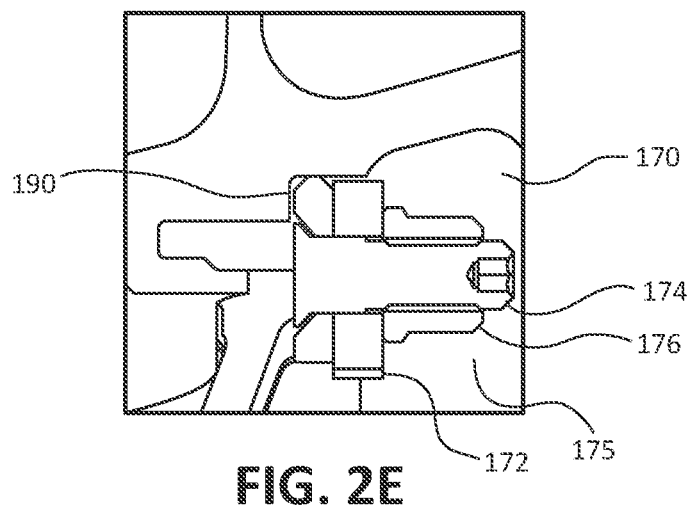
FIG. 2E illustrates a cross-sectional view of retaining ring installed in a high pressure turbine case at a third circumferential location, in accordance with various embodiments.
Figure 3:
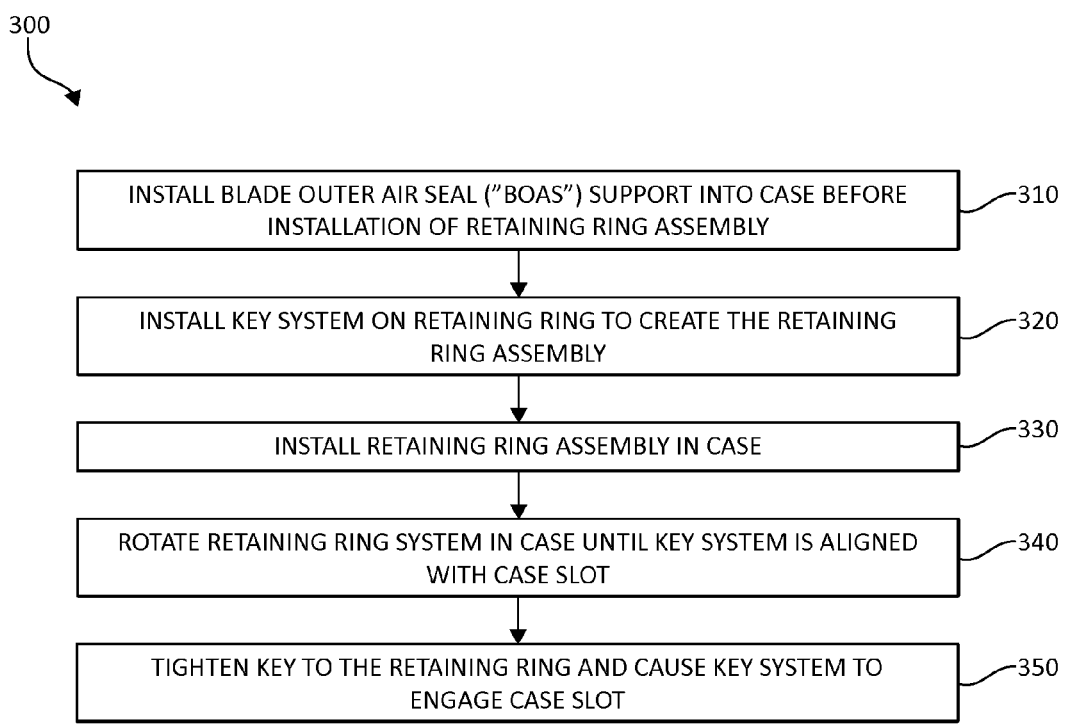
FIG. 3 is an installation process for a retaining ring, in accordance with various embodiments.

In various embodiments and with reference to FIG. 2A through FIG. 3, a method 300 for installing a retaining ring in a turbine case is provided. Method 300 may include installing BOAS support structure 149 into a case before installation of retaining ring assembly 195 (Step 310). Method 300 may further include installing key system 170 on retaining ring 190 to create the retaining ring assembly 195 (Step 320). In response to creating clearance for the retaining ring assembly 195, method 300 may further include installing retaining ring assembly 195 in case 129 (step 330). More specifically, retaining ring assembly 195 may be installed in slot 181 of case 129. Moreover, retaining ring assembly 195 may be installed in slot 181 such that it is allowed to move circumferentially within the case. Method 300 may further include rotating retaining ring assembly 195 in case 129 until key 172 is aligned with case slot 184 (step 340). Based on the sliding of the retaining ring within slot 181, one or more supports 192 may align with one or more support tabs 180. Method 300 may further include engaging fastener system 175 to tighten key 172 to retaining ring 190 and cause key 172 to engage case slot 184 (step 350). The engagement of case slot 184 by key 172 may limit the circumferential motion of retaining ring 190 within slot 181. Moreover, the appropriate clocking of retaining ring 190 and the engagement of support 192 at support tab 180 may limit and/or restrain any radial motion of retaining ring 190.

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retaining ring assembly, comprising,
    a support structure having a support tab that is configured to engage a blade outer air seal tab;
    a retaining ring configured to retain the support structure;
    a fastener installable through the retaining ring;
    a key washer installable on the fastener; and
    a nut installable on the fastener and configured to tighten the key washer to the retaining ring, wherein the fastener only passes through the nut, the key washer, and the retaining ring.

2. The retaining ring assembly of claim 1, the retaining ring installable in a high pressure turbine case.

3. The retaining ring assembly of claim 2, the key washer restrains circumferential movement and the support structure restrains radial movement of the retaining ring of the retaining ring assembly in response to the retaining ring being installed in a high pressure turbine case.

4. The retaining ring assembly of claim 3, wherein the high pressure turbine case comprises a case slot which comprises a first shape; the key washer comprises a second shape that corresponds to the first shape; and the key washer engages the turbine case in the case slot to restrain circumferential movement of the retaining ring.

5. The retaining ring assembly of claim 2, wherein the fastener and the support tab engage the retaining ring at circumferentially different points of the retaining ring.

6. A gas turbine engine, comprising:
a compressor;
a combustor in fluid communication with the compressor;
a turbine in fluid communication with the combustor;
a retaining ring assembly installable in a turbine case, the retaining ring assembly comprising,
a retaining ring;
a fastener installable through the retaining ring;
a key washer installable on the fastener; and
a nut installable on the fastener and configured to tighten the key washer to the retaining ring, wherein the fastener only passes through the nut, the key washer, and the retaining ring, and cause the key washer to engage the turbine case.

7. The gas turbine engine of claim 6, wherein the key washer restrains circumferential movement of the retaining ring assembly in response to the retaining ring being installed in a high pressure turbine case.

8. The gas turbine engine of claim 6, the retaining ring further comprising a support structure that is configured to engage a blade outer air seal support tab.

9. The gas turbine engine of claim 8, wherein the support structure restrains radial movement of the retaining ring of the retaining ring assembly in response to the retaining ring being installed in a high pressure turbine case.

* * * * *